United States Patent [19]

Reich et al.

[11] Patent Number: 4,868,251

[45] Date of Patent: Sep. 19, 1989

[54] ULTRAVIOLET LIGHT ABSORBING SILICONE COMPOSITIONS

[75] Inventors: Cary J. Reich, Laguna Hills; F. Richard Christ, Orange, both of Calif.

[73] Assignee: Allergan, Inc., Irvine, Calif.

[21] Appl. No.: 122,945

[22] Filed: Nov. 19, 1987

Related U.S. Application Data

[63] Continuation of Ser. No. 946,703, Dec. 24, 1986, abandoned.

[51] Int. Cl.$^4$ .................. C08L 83/10; C08L 83/05
[52] U.S. Cl. ...................... 525/479; 525/281; 525/478; 528/27
[58] Field of Search .............. 525/479, 281, 478; 528/27

[56] References Cited

U.S. PATENT DOCUMENTS

| | | | |
|---|---|---|---|
| 3,159,646 | 12/1964 | Milionis et al. | 525/281 |
| 4,250,268 | 2/1981 | Rody et al. | 525/100 |
| 4,299,746 | 11/1981 | Frye | 524/266 |
| 4,373,060 | 2/1983 | Ching | 524/767 |
| 4,380,643 | 4/1983 | Yoshida et al. | 525/281 |

FOREIGN PATENT DOCUMENTS 57-105413  6/1982  Japan .

OTHER PUBLICATIONS

*Polymer Journal*, "Functional Polymers XVIII", Kitayama et al., vol. 14, No. 7, pp. 537–543 (1982).

Primary Examiner—Wilbert J. Briggs, Sr.
Attorney, Agent, or Firm—Gordon L. Peterson; Frank J. Uxa, Jr.

[57] ABSTRACT

An ultraviolet light absorbing silicone composition comprising silicone elastomer and, covalently bonded thereto, ultraviolet light absorbing component derived from one or more vinyl functional, polymerizable ultraviolet absorbing monomers having the following structures:

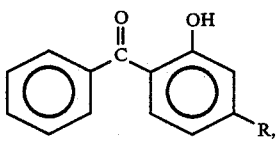

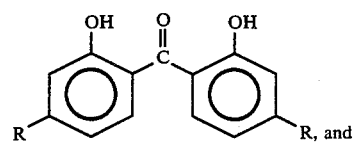

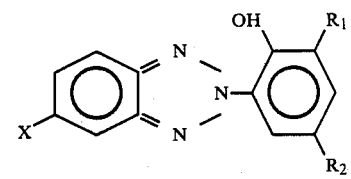

and mixtures thereof, wherein X is selected from the group consisting of H, alkoxy radicals and halogen, $R_1$ is selected from the group consisting of H and alkyl radicals, provided that at least one of X and $R_1$ is other than H, and $R_2$ and R are independently selected from organic radicals with a terminal double bond.

17 Claims, No Drawings

ULTRAVIOLET LIGHT ABSORBING SILICONE COMPOSITIONS

RELATED APPLICATION

This application is a continuation-in-part of copending application Ser. No. 946,703, filed Dec. 24, 1986 now abandoned.

BACKGROUND OF THE INVENTION

This invention relates to ultraviolet light absorbing polymer compositions, and more particularly, to polymer compositions including silicone elastomers and covalently bonded ultraviolet light absorbing components. The subject polymer compositions, which are preferably optically clear, may be used in the fabrication of ultraviolet light absorbing ocular devices such as corneal contact lenses, intraocular lenses, and corneal intrastromal implant lenses.

The incident light entering the eye is composed of the entire spectrum of wavelengths including the ultraviolet, visible, and infrared. The cornea preferentially filters ultraviolet light up to about 300 nm. The natural lens normally screens ultraviolet light in the range of about 300 nm to about 400 nm. Thus, in the eye with its natural lens in place relatively little radiation of wavelengths less that about 400 nm reaches the posterior intraocular structures, e.g., the vitreous humor and the retina.

in the aphakic individual, i.e., that individual who has had the natural crystalline lens removed, there is a loss in protection for the retina from ultraviolet light in the above-noted range. Thus, the use of ultraviolet light absorbing contact or intraocular lenses is particularly important for the aphakic person. It is further believed that ultraviolet light screening spectacles or contact lenses may retard the development of a cataract in the natural lens.

Although low molecular weight, non-polymerizable ultraviolet absorbing compounds of various types are effective in blocking ultraviolet radiation when compounded into polymer formulations, their extractability in various media may limit their utility. These problems are remedied by the synthesis of polymerizable, ultraviolet-absorbing monomers which can be covalently coupled into the polymer matrix. These covalently bonded ultraviolet light absorbing monomers are not extractable. Articles fabricated from ultraviolet light absorbing silicone compositions incorporating these polymerizable ultraviolet light absorbing monomers therefore maintain stable ultraviolet screening characteristics and do not exhibit haze.

It is known that cetain polymerizable derivatives of 2-(2'-hydroxyphenyl)-2H-benzotriazole and 2-hydroxybenzophenone are efficient ultraviolet light absorbing species that can be copolymerized into a variety of polymeric materials. Commonly assigned, co-pending application Serial No. 109,727, filed October 16, 1987, discloses ultraviolet light absorbing compositions derived from vinyl functional monomers and certain vinyl functional, ultraviolet light absorbing derivatives of 2-(2-hydroxy)-2H-benzotriazole. This application is incorporated in its entirety by reference herein.

In *J. Macromol Sci.-Chem.* A 22(A), p. 382–402 (1985), Dickstein and Vogl disclose 2-(2-hydroxy-5-vinylphenyl)-2H-benzotriazole being co- and terpolymerized with N-vinylpyrrolidone and various methacrylic esters. The polymerizations result in insoluble polymers from which the ultraviolet light absorbing component cannot be extracted or leached out. The polymers have water absorption behavior similar to that of co- and terpolymers withou the incorporation of the ultraviolet light absorbing component.

Beard, et al, U.S. Pat. No. 4,528,311, discloses ultraviolet light absorbing polymer compositions comprising copolymers of 2-(2-hydroxy-5-acrylyloxyphenyl)-2H-benzotriazoles with one or more other vinyl monomers, specifically acrylic monomers such as methyl methacrylate. The benzotriazole compound imparts ultraviolet light absorbing properties to the copolymer at concentrations of 1.0% by weight or less. The composition is useful in the manufacture of ocular devices. There is no indication, however, of a benzotriazole-type compound having an alkenyl group with a terminal double bond.

Loshaek U.S. Pat. Nos. 4,304,895 and 4,390,676 disclose ultraviolet light absorbing lenses which contain 2-hydroxy-4-mehacryloxy benzophenone and methyl methacrylate or 2-hydroxyethyl methacrylate.

Besecke, et al U.S. Pat. No. 4,612,358 discloses the use of certain benzotriazole derivatives, in particular 2-(2-hydroxy-3-methacrylamidomethyl-5-tert-octylphenyl) benzotriazole, having ultraviolet light absorbing properties in polymers with unsaturated vinyl or vinylidene monomers. Beseck et al does not disclose benzotriazole-type compounds having an alkenyl group with a terminal double bond.

Rody U.S. Pat. No. 4,250,268 discloses polysiloxanes with light stabilizers containing polyalkylpiperidine groups. The stabilizers are not chemically incorporated into the polysiloxanes. Kimura, et a U.S. Pat. No. 4,555,545 discloses a coating composition containing a co-polymer of certain unsubstituted, hydroxybenzophenones and epoxy group-containing trialkoxysilznes. Combining this copolymer with an organosilanetriol and colloidal silica provides a coating composition having UV-ray resistance. No hydroxybenzophenones which have organic substituents with terminal double bonds are suggested.

Yoshida, et al U.S. Patent 4,380,643 discloses 2-hydroxy benzotriazole compounds having a polymerizable unsaturated group on the phenyl ring of the benzotriazole group as a source of polymeric ultraviolet absorbers. The other phenyl group of the benzotriazole compounds have no functional, i.e., polymerizable, substituent groups. In *Polymers Journal,* Vol 14, No. 7, pp 537–543 (1982), M. Kitayama and O. Vogl disclose grafting the ultraviolet stabilizer 2-(2-hydroxy-5-vinylphenyl)-2H-benzotriazole onto 1,2-polybutadiene and cis-1,4-polybutadiene. Silicone base polymers are not suggested.

Other U.S. Pat. Nos. which were considered in preparing this application are 4,131,604, 4,636,212, 4,158,030, and 4,285,073.

In a report compiled by the materials research staff of American Medical Optics dated September, 1985, entitled "Preclinical Evaluation of an Elastomeric Silicone Material for Use as a Small Incision Intraocular Lens", Technical Report Series No. 16, a silicone elastomer which contains approximately 0.25% by weight of a covalently bound monomeric ultraviolet blocking agent is disclosed as meeting the design criteria for a soft intraocular lens material. No specific ultraviolet light absorbing monomers are disclosed.

Materials used to manufacture ocular devices, such as contact lenses, intraocular lenses and corneal intrastromal implant lenses should be capable of absorbing ultraviolet light for the aphakic patient. The ultraviolet light absorber should be capable of absorbing radiation in the range of about 300 nm to about 400 nm. Non-water soluble UV absorbing benzotriazoles and benzophenones have heretofore not been known to copolymerize with silicone elastomers to form ultraviolet absorbing compositions. However, an article by Bachrach and Zilkha, "Attachment of Drugs to Polydimethylsiloxanes" in *Eur. Polym. J.* 20, (5) 493–500 (1984) describes vinyl-functional drug molecules being covalently bonded to silicone matrices.

SUMMARY OF THE INVENTION

New ultraviolet light absorbing compositions have been discovered. These compositions comprise silicone elastomer and, covalently bonded thereto, ultraviolet light absorbing component derived from one or more of certain vinyl functional, polymerizable ultraviolet absorbing monomers. These compositions can be used to absorb radiation in the wavelength range of about 300 nm to about 400 nm. The compositions are preferably optically clear and can be utilized for the manufacture of contact, intraocular and corneal intrastromal lenses. There is no significant extraction of the ultraviolet light absorbing component, e.g., during normal use of the compositions or lenses.

In one embodiment, the ultraviolet light absorbing monomers that are useful in producing the present compositions comprise vinyl functional, polymerizable ultraviolet light absorbing benzotriazole monomers having the following structure or formula:

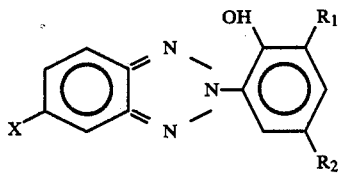

and mixtures thereof, wherein X is selected from the group consisting of H, alkoxy radicals preferably containing 1 to about 6 carbon atoms, and halogen, $R_1$ is selected from the group consisting of H and alkyl radicals, preferably containing 1 to about 8 carbon atoms, provided that at least one of X and $R_1$ is other than H, and $R_2$ is an organic radical, preferably an alkenyl radical, with a terminal double bond. The alkoxy radical is preferably selected from the group consisting of methyl radical and t-alkyl radicals containing 4 to about 6 carbon atoms. The present compositions, including the covalently bonded ultraviolet light absorbing component preferably are capable of absorbing ultraviolet light in the range of about 300 nm. to about 400 nm.

In another embodiment, the present ultraviolet light absorbing compositions include ultraviolet light absorbing component derived from one or more of certain 2-hydroxybenzophenones.

The ultraviolet light absorbing compositions of the present invention are preferably optically clear, stable materials useful in the fabrication of corneal contact lenses, corneal intrastromal lenses and intraocular lenses. If one or more of the substituted benzotriazole monomers are employed, about 0.1% to about 5% by weight of the ultraviolet light absorbing component is preferably included in the composition to yield the appropriate ultraviolet blocking efficiency, e.g., in samples of thickness comparable to the final lens products.

If one or more of the benzophenone monomers are employed, about 1% to about 10% by weight of the ultraviolet light absorbing component is preferably required to achieve appropriate ultraviolet light screening characteristics. For example, the ultraviolet light absorbing compositions of the present invention can be formulated to completely block ultraviolet radiation in the range of about 300 nm to about 390 nm and to display about 2% to about 20% transmittance at 400 nm for 0.75 mm thick samples.

The ultraviolet light absorbing silicone composition substantially retains the physical characteristics of the non-ultraviolet absorbing silicone composition. The silicone compositions are such that the vinyl functional ultraviolet light absorbing component may be covalently attached thereto. Suitable silicone elastomers include, for example, two-part platinum catalyzed, vinyl/hydride, addition cured polydimethylsiloxanes, poly(dimethyl-diphenyl) siloxanes, and polyorganofluorosiloxanes, as well as other addition cured polyorganosiloxanes and mixtures thereof. In one embodiment, the silicone elastomers are preferably described by the following formula:

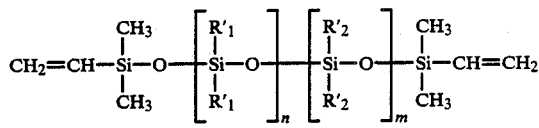

wherein $R'_1$ is a methyl radical, $R'_2$ is selected from the group consisting of alkyl radicals, fluoro alkyl radicals, alkenyl radicals with a terminal double bond, aryl radicals and substituted aryl radicals, and n and m are independently selected from integers from 0 to about 500.

The functional ultraviolet light absorbing monomers are preferably reacted with hydride functional siloxane cross-linking molecules to covalently attach the ultraviolet component. The cross-linking molecules are preferably a component of a two-part platinum catalyzed, addition cured silicone elastomer formulation. The ultraviolet absorbing component is preferably attached to the siloxane cross-linking molecule by a platinum catalyzed reaction. For example, the ultraviolet light absorbing monomer may act to form an ethylenic bridging group similar to that which forms when the siloxane cross-linking molecule binds together siloxane polymer molecules in the normal curing reaction of silicone elastomer networks.

DETAILED DESCRIPTION

The present invention relates to an ultraviolet light absorbing composition comprising a silicone elastomer to which an ultraviolet light absorbing component is covalently attached.

In accordance with this invention, there is provided a new composition of matter, ultraviolet light absorbing silicone elastomers, for example, ultraviolet light absorbing polyorganosiloxane elastomers, prepared by the covalent attachment of certain vinyl functional, ultraviolet light absorbing monomers to silicone elastomers, preferably to hydride functional siloxane cross-linking agents or molecules. The preferred base polymer utilized in the present invention is as follows:

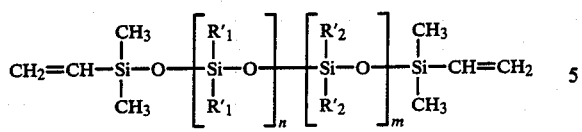
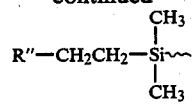

Covalently-bonded UV-absorbing monomer wherein R'₁ is a methyl radical, R'₂ is selected from the group consisting of alkyl radicals, flouro alkyl radicals, alkenyl radicals with terminal double bonds, aryl radicals, substituted aryl radicals and mixtures thereof; and n and m are independently selected from integers in the range of 0 to about 500. More preferably, R'₂ is selected from the group consisting of alkyl radicals containing 1 to about 4 carbon atoms, flouro alkyl radicals containing 1 to about 3 carbon atoms, phenyl radical, substituted aryl radicals, alkenyl radicals containing 2 to about 4 carbon atoms and having a terminal double bond and mixtures thereof.

The cross-linking molecules useful in the present invention are preferably components of a two part, silicone elastomer formulation, more preferably a two part, platinum catalyzed vinyl/hydride, addition cured silicone elastomer. In one embodiment, the attachment of the ultraviolet light absorbing monomer to the silicone elastomer preferably proceeds by a platinum catalyzed reaction to form an ethylenic bridging group similar to that which forms when a cross-linking molecule binds together siloxane polymer molecules in the normal curing reaction of the silicone elastomer. These reactions may be illustrated as follows:

Scheme 1

Silicone Elastomer Cross-Linking Reaction

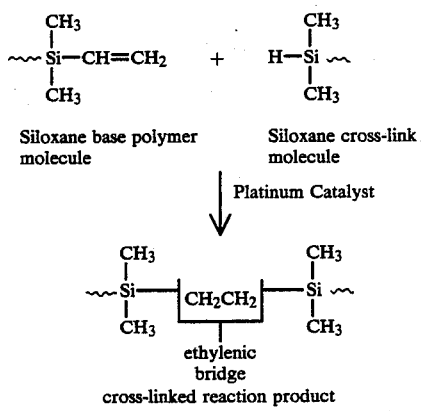

SCHEME 2

Covalent Attachment of the Ultraviolet Absorbing Monomer to the Siloxane Cross-Linking Molecule

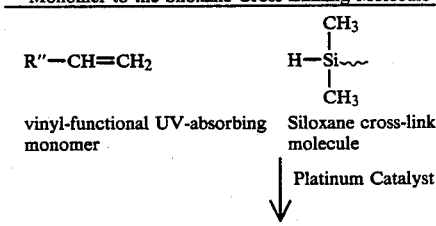

wherein R'' equals the UV absorbing chromophore

The siloxane cross-linking molecule preferably possesses a multiplicity of hydride functional sites. Thus, each cross-linking molecule can participate both in the covalent attachment of the ultraviolet absorbing monomer as well as in the formation of cross-links (i.e., ethylenic bridges) between siloxane polymer molecules.

The covalent attachment of the ultraviolet absorbing monomer can be made to occur at either of two steps in the process of producing an ultraviolet absorbing silicone elastomer. One method is to simply dissolve the ultrviolet absorbing monomer into a mixture of the silicone components and to allow the covalent attachment of the ultraviolet absorbing monomer to occur simultaneous to the formation of the cross-links. Alternatively, the ultraviolet absorbing monomer can be pre-reacted with the siloxane cross-linking molecule to form essentially an ultraviolet absorbing, cross-linking adduct. The composite molecule is subsequently formulated with siloxane base polymer, and preferably additional platinum catalyst, to be cured into the ultraviolet absorbing silicone elastomer. In either case a degree of incorporation of the ultraviolet absorber monomer of greater than 99.9% is preferable.

The ultraviolet absorbing component covalently attached to the silicone elastomer does not leach out in aqueous or organic solvents.

In one embodiment, the ultraviolet absorbing monomer has vinyl functionality and is selected from the group of compounds having the following structure or formula:

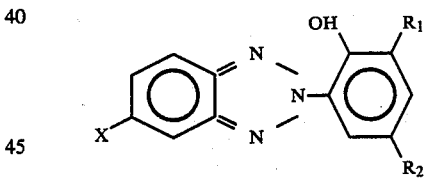

and mixtures thereof, wherein X is selected from the group consisting of H, alkoxy radicals, preferably containing 1 to about 6 carbon atoms, and halogen, R₁ is selected from the group consisting of H and alkyl radicals, preferably containing 1 to about 8 carbon atoms, more preferably selected from the group consisting of methyl radicals and t-alkyl radicals containing 4 to about 6 carbon atoms, provided that at least one of X and R₁ is other than H. R₂ is an organic radical with a terminal double bond including a vinyl, acrylate or methacrylate functionality. Typically, the substituted benzotriazoles useful in the present invention absorb ultraviolet light strongly in the range of about 300 nm to about 400 nm, and exhibit reduced absorption at wavelengths higher that about 400 nm.

A specific preferred ultraviolet light absorbing monomer is 2-(2-hydroxy-3-t-butyl-5-vinylphenyl)-5-chloro-2H-benzotriazole.

The synthesis of some polymerizable hydroxy phenylbenzotriazoles is disclosed in *J. Macro Chem.* 183 (1982) p. 259–279, Yoshida & Vogl. One particularly preferred method for producing 2-(2-hydroxy-3-t-butyl-5 vinylphenyl)-5-chloro-2H-benzotriazole is described in Examle 1 herein. Other useful substituted benzotriazole ultraviolet light absorbing monomers may be produced using analogous synthesis schemes.

Ultraviolet light absorbing 2-hydroxybenzophenones useful in the present invention preferably have one of the following structures:

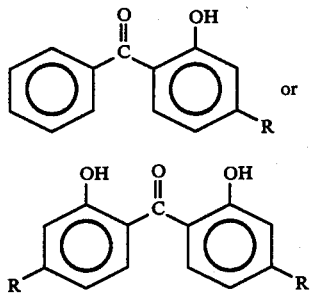

wherein R is an organic group containing a terminal double bond. Typical, though non-limiting, examples of 2-hydroxybenzophenones that may be used in the present invention include 2-hydrox-4-(2-hydroxy propyloxymethyacrylate)benzophenone, 2-hydroxy-4-ethoxymethacrylate benzophenone, 2-hydroxy-4-methacryloxy benzophenone and mixtures thereof. The presently useful 2-hydroxybenzophenones may be produced using conventional and/or well known synthesis techniques.

Preferably, when a benzotriazole derivative is employed, the maximum amount of the ultraviolet light absorbing monomer incorporated in the ultraviolet light absorbing composition of the present invention is less than about 5% by weight and more preferably about 1% or less by weight, especially about 0.1% to about 1% by weight, based on the total composition. When a benzophenone derivative is employed, it is preferred to be incorporated in an amount in the range of about 10% or less, more preferably about 1% to about 10%, by weight of the composition. Of course, it is understood that the ultraviolet absorbing monomer is not present as such in the composition, but is part of the polymer. However, for convenience and simplicity, in certain instances herein the ultraviolet absorbing monomer is referred to as being present in the polymer. The percentages of ultraviolet light absorbing monomer in the polymer referred to herein mean the weight percent of such monomer based on the total monomers (including the silicone elastomer-producing monomer or monomers) used to produce the composition. The amount of ultraviolet light absorbing monomer included in the monomer mixture is that required to give the degree of light absorption desired and is dependent, for example, on the specific UV absorbing monomer or monomers employed, the specific silicone elastomer producing monomer or monomers employed and on the thickness, e.g., the optical path, of the product, e.g., lens, to be made from the polymeric compositions. By Beers Law of Absorption, the required amount of absorber is inversely proportional to the optical path length through the lens device. It is often desired that the ultraviolet light transmission at 400 nm be less than about 10 to 15% of the incident light and at 390 nm be less than about 3%. The visible light transmission in the 410-450 nm range often should not be reduced below about 50% of the total light.

The UV absorber, 2-(2-hydroxy-3-t-butyl-5-vinylphenyl)-5-chloro-2H-benzotriazole, has the following physical characteristics:
1 —Melting point—129°C.
2 —UV-Absorption Spectrum—The absorption data for approximately 5ppm benzotriazole in CHCl₃ using a 1 cm quartz cell are as follows:

$$\Sigma(\lambda Max312nm) = 1.74 \times 10^4 cm^2/mole$$

$$\Sigma(\lambda Max350nm) = 1.26 \times 10^4 cm^2/mole$$

wherein Σ is the symbol for the extinction coefficient.

The above-noted, specifically preferred substituted benzotriazole ultraviolet light absorbing monomer of the present invention is polymerizable and, because of its high molar absorptivity (or extinction coefficient), to imparts excellent ultraviolet absorbing properties to the silicone composition even at concentrations of 1% by weight or less.

The invention will be further described in connection with the following examples which are set forth for purposes of illustration only and in which proportions are by weight and temperatures are in degrees centrigrade unless specifically stated otherwise.

A quantity of the UV light absorbing monomer, 2-(2-hydroxy-3-t-butyl-5-vinylphenyl)-5-chloro-2H-benzotriazole, was produced as follows. The starting material is 2-(2-hydroxy-3-t-butyl-5-methylphenyl)-5-chloro-2H-benzotriazole, hereinafter identified as "I", which is commercially available.

Unless otherwise noted, all solvents and reagents were ACs reagent grade and were used without further purification. The TLC Rf values were obtained on Analtech Silica GHLF plates and eluted with 100 percent reagent grade CHCl₃.

EXAMPLE 1

Preparation of:
2-(2-acetoxy-3-5-butyl-5-methylphenyl)-5-chloro-2H-benzotriazole, hereinafter identified as "II".

One mole (315gms) of I was suspended in 1250 mls of acetic anhydride and 10 mls concentrated H₂SO₄. The suspension was stirred at 75° C. for 3 hours. The system was homogeneous when heated. The suspension was cooled to room temperature and then refrigerated several hours. II was collected by vacuum filtration. The solid was suspended in 1 liter of water saturated with NaHCO₃ and stirred for one half hour. The solid was recollected, washed several times with distilled water, and dried at 50° C. and 29 in. Hg for several hours.

Product: a white powder, M.P. 130-132° C., Rf =0.60

EXAMPLE 2

Preparation of: 2-(2-acetoxy-3-t-butyl-5-dibromomethylphenyl)-5-chloro-2H-benzotriazole, hereinafter identified as "III".

320 gms of II was suspended in 1300 ml of CCl₄ in a reaction kettle fitted with a condenser, stirrer, heat source drying tube and light source. The mixture was brought to near reflux and 336 gms of N-Bromosuccinimide was added. After 15 minutes, approximately 0.5 gms of an azobisisobutyronitrile (AIBN) initiator, Vazo 64, sold by DuPont was added. The reaction was allowed to proceed at reflux for 4 to 6 hours. If the pale orange color of bromine disappeared, an additional 0.25 gm of AIBN was added, and the reaction continued for another 2 hours. The hot reaction mixture was filtered to remove the succinimide. The CCl$_4$ solution was cooled to room temperature and then refrigerated for several hours. III was collected by filtration, washed with 200 mls CCl$_4$, and dried at 50° C., 20 in, Hg for several hours.

Product: a white powder, M.P. 162–163° C., Rf=0.61

EXAMPLE 3

Preparation of: 2-(2-acetoxy-3-t-butyl-5-formylphenyl)-5-chloro-2H-benzotriazole, hereinafter identified as "IV".

323 gms of III was suspended in 725 ml dimethoxy ethane (glyme) in a reaction kettle fitted with a heating mantle, stirrer, condenser, and addition funnel. The mixture was heated to near reflux and became homogeneous. A solution of 219 gms AgNO$_3$ in 120 mls H$_2$O was slowly added at a rate which maintained a mild reflux (2 drops/second). The reaction mixture became cloudy and AgBr precipitated as a pale green solid. The AgBr was removed by filtration, and 200 mls of glyme was added to the remaining mixture. Approximately one half of the glyme was removed with a rotary evaporator. Two volumes of CHCl$_3$ was added and the mixture was then washed with distilled water until the wash was neutral to pH paper. The mixture was then dried over MgSO$_4$, filtered and the solvent was removed by rotary evaporation. The solid crude IV was washed with distilled water and dried for several hours at 50° C., in vacuo.

Product: a pale yellow solid, M.P. 129–131° C. Rf =0.32

EXAMPLE 4

Preparation of: 2-(2-acetoxy-3-t-butyl-5-(2-hydroxyethyl)phenyl)-5-chloro-2H-benzotriazole, hereinafter identified as "V".

A solution of 163 gms of IV and 650 mls of dry tetrahydrofuran (THF) in a dry reaction kettle fitted with stirrer, condenser, drying tube, addition funnel, and dry nitrogen pure was prepared. 0.6 moles methyl Grignard in diethyl ether (214 mls of 2.8M methyl magnesium bromide) was transferred under anhydrous conditions to the addition funnel. The Grignard reagent solution was slowly added to the solution of UV so that a moderate reflux was maintained. This reflux was continued for an additional 15 minutes after the final addition was made. The reaction mixture was cooled. 90 mls of a saturated NH$_4$Cl aqueous solution was slowly added. The solid was filtrated from the hot THF/ether solution and then the solvent was removed by rotary evaporation. The resulting orange-yellow oil was dissolved in CHCl$_3$ and the solution was dried over MgSO$_4$. The ChCl$_3$ was removed by rotary evaporation.

Product: a brown-orange solid, M.P. 132–141° C.

EXAMPLE 5

Preparation of: 2-(2-hydroxy-3-t-butyl-5-(2-hydroxyethyl)phenyl)-5-chloro-2H-benzotriazole, hereinafter identified as "VI".

153 gms of V was dissolved in a solution of 60 mls of H$_2$O, 540 mls of ethanol, and 35 gms of KOH. The solution was refluxed for 3 hours and stirred several hours. at room temperature. The alcohol was removed at reduced pressure using a rotary evaporator. 100 mls of distilled water was added and enough HCl was added to bring the pH to 6. 100 mls CHCl$_3$ was added to the mixture which was then stirred until the solids were dissolved. The water layer was extracted three times with CHCl$_3$. The combined CHCl$_3$ extracts were dried over MgSO$_4$. The CHCl$_3$ was removed by rotary evaporation.

Product: a yellow-orange solid, M.P.60–66° C., Rf=0.18.

EXAMPLE 6

Preparation of 2-(2-hydroxy-3-t-butyl-5-vinylphenyl)-5-chloro-2H-benzotriazole, hereinafter identified as "VII".

103 gms of VI was dissolved in 500 mls of N,N dimethyl acetamide. 0.1 gm of picric acid and 50 gms of freshly fused and ground KHSO$_4$ was added. The mixture was refluxed for one-half hour. The product was cooled and transferred to 500 mls of cold distilled water. The precipitated yellow solid was collected by vacuum filtration and washed with methanol. The solid was recrystallized 2 times in 1:5 (by volume) CHCl$_3$:CH$_3$OH. 30 gms of the recrystallized product was dissolved in a minimal volume of 25/75 (by volume) CHCl$_3$/hexane solution. A liquid chromatography column was packed with 300 gms silica gel and the CHCl$_3$/hexane solution was eluted therethrough. Pure 2(2-hydroxy-3-t-butyl-5-vinylphenyl)-5-chlorobenzotriazole was collected in approximately the first 500 mls of eluate. The CHCl$_3$ was removed using a rotary evaporator at room temperature.

EXAMPLE 7

A platinum-cured silicone elastomer containing a covalently attached and non-extractable hydroxy benzophenone UV absorber was prepared using the following formulation:

| | | |
|---|---|---|
| A. | KE-1935 (manufactured by Shin-Etsu Chemical Company, Ltd.) Silicone Part A | 50 Parts by Wt. |
| B. | KE-1935 Silicone Part B | 50 Parts by Wt. |
| C. | 2-hydroxy-4-(2-hydroxy propyloxymethacrylate) benzophenone (Permasorb MA manufactured by National Starch and Chemical) | 0.25 Parts by Wt. |

The benzophenone and Part B were mixed and heated at 130° C. until homogeneous. Part 4 was then added to the system which was mixed thoroughly. The mixture was cured in aluminum dishes at 150° C. for 20 minutes.

To examine the resulting silicone elastomer for extractable UV absorber, 0.5 gram of silicone was swelled in 100 ml of methylene chloride with shaking for 24 hours. The resulting extract was examined for free UV absorber by HPLC. No UV absorber was detached indicating a degree of incorporation greater than 99.9%.

EXAMPLE 8

A platinum-cured silicone elastomer containing a covalently bound and non-extractable hydroxy benzophenone UV absorber was prepared using the following formulation:

| | | |
|---|---|---|
| A. | KE-1935 Silicone Part A | 50 Parts by Wt. |
| B. | KE-1935 Silicone Part B | 50 Parts by Wt. |

| | | |
|---|---|---|
| C. | 2-hydroxy-4-(ethoxy methacrylate) benzophenone (Cyasorb 208B manufactured by American Cyanamid) | 0.25 Parts by Wt. |

The benzophenone and Part B were mixed and heated at 130° C. until homogenous. Part A was then added to the system which was mixed thoroughly. The mixture was cured in aluminum dishes at 150° C. for 20 minutes.

To examine the resulting silicone elastomer for extractable UV absorber, 0.5 gram of silicone was swelled in 200 ml of methylene chloride with shaking for 24 hours. The resulting extract was examined for free UV absorber by HPLC. No UV absorber was detected indicating a degree of incorporation greater than 99.99%.

EXAMPLE 9

A platinum-cured room-temperature vulcanizing (RTV) silicone elastomer containing a covalently bound, and non-extractable benzotriazole ultraviolet absorber was prepared using the following formulation:

| | |
|---|---|
| General Electric RTV-615 Silicone Part A | 27 Parts by Wt. |
| General Electric RTV-615 Silicone Part B | 3 Parts by Wt. |
| 2-(2-hydroxy-3-t-butyl-5-vinylphenyl)-5-chloro-2H—benzotriazole | .075 Parts by Wt. |

The UV absorber was dissolved into Part A using isopropyl alcohol (IPA) and heat. The IPA was stripped off using heat and vacuum. The homogeneous Part A/UV absorber mixture was then combined and thoroughly mixed with Part B. The mixture was cured in a polished stainless steel mold at 150° C. for 15 minutes.

The ultraviolet absorbing characteristics of the UV absorber containing silicone elastomer were compared to the same silicone elastomer without UV absorber. Without the UV absorber, the material exhibits a 10% transmittance cut-off wavelength of 215 nm. With the UV absorber, the material exhibits a 10% transmittance cut-off wavelength of 400 nm.

To examine the ultraviolet absorbing silicone elastomer for extractable UV absorber, approximately 0.5 grams of the silicone elastomer was swelled in 80 ml of tetrahydrofuran for 24 hours. The resulting extract was examined for free UV absorber by ultraviolet spectrophotometry. No UV absorber was detected indicating a degree of incorporation of greater than 99.99%.

EXAMPLE 10

A platinum-cured room-temperature vulcanizing (RTV) silicone elastomer containing a covalently bound and non-extractable benzotriazole ultraviolet absorber was prepared using to the following formulation:

| | |
|---|---|
| General Electric RTV-655 Silicone Part A | 27 Parts by Wt. |
| General Electric RTV-655, Silicone Part B | 3 Parts by Wt. |
| 2-(2-hydroxy-3-t-butyl-5-vinylphenyl)-5-chloro-2H—benzotriazole | .075 Parts by Wt. |

The UV absorber was dissolved into Part A using isopropyl alcohol (IPA) and heat. The IPA was stripped off using heat and vacuum. The homogeneous Part A/UV absorber mixture was then combined and thoroughly mixed with Part B. The mixture was cured in a polished stainless steel mold at 150° C. for 15 minutes.

The ultraviolet absorbing characteristics of the UV absorber containing silicone elastomer were compared to the same silicone material without UV absorber. Without the UV absorber, the material exhibited a 10% transmittance shut-off wavelength of 275 nm. With the UV absorber, the material exhibited a 10% transmittance cut-off wavelength of 400 nm.

To examine the ultraviolet absorbing silicone elastomer for extractable UV absorber, approximately 0.5 grams of the silicone elastomer was swelled in 80 ml of tetrahydrofuran for 24 hours. The resulting extract was examined for free UV absorber by ultraviolet spectrophotometry. No UV absorber was detected indicating a degree of incorporation of greater than 99.99%.

EXAMPLE 11

A platinum-cured silicone elastomer containing a covalently bound and non-extractable benzotriazole ultraviolet absorber was prepared using the following formulation:

| | | |
|---|---|---|
| A. | KE-1935 Silicone Part A | 50 Parts by Wt. |
| B. | KE-1935 Silicone Part B | 50 Parts by Wt. |
| C. | 2-(2-hydroxy-3-t-butyl-5-vinylphenyl)-5-chloro-2H—benzotriazole | 0.25 Parts by Wt. |

The UV absorber was dissolved into Part B using isopropyl alcohol (IPA) and heat. The IPA was stripped off using heat and vacuum. The homogeneous Part B/UV absorber mixture was then combined and thoroughly mixed with Part A. The mixture was cured in a polished stainless steel mold at 150° C. for 15 minutes.

The ultraviolet absorbing characteristics of the UV absorber containing silicone elastomer were compared to the same silicone elastomer without UV absorber. Without the UV absorber, the material exhibits a 10% transmittance cut-off wavelength of 215 nm. With the UV absorber, the material exhibits a 10% transmittance cut-off wavelength of 400nm.

To examine the ultraviolet absorbing silicone elastomer for extractable UV absorber, approximately 0.5 grams of the silicone elastomer was swelled in 80 ml of tetrahydrofuran for 24 hours. The resulting extract was examined for free UV absorber by ultraviolet spectrophotometry. No absorber was detected indicating a degree of incorporation of greater than 99.99%.

While this invention has been described with respect to various specific examples and embodiments, it is to be understood that the invention is not limited thereto and that it can be variously practiced within the scope of the following claims.

What is claimed:

1. An ultraviolet light absorbing silicone composition comprising silicone base polymer selected from the group consisting of platinum catalyzed vinyl-hydride addition cured polydiorganosiloxanes and mixtures thereof and, covalently bonded thereto, ultraviolet light absorbing component derived from one or more vinyl functional, polymerizable ultraviolet absorbing monomers having the following structure:

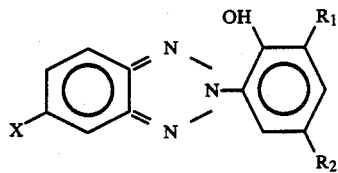

and mixtures thereof, wherein X is selected from the group consisting of H, alkoxy radicals and halogen, $R_1$ is selected from the group consisting of H and alkyl radicals, provided that at least one of X and $R_1$ is other than H, and $R_2$ is an organic radical with a terminal double bond.

2. The composition of claim 1 wherein $R_2$ is a straight chain or branched chain alkenyl group.

3. The composition of claim 1 wherein the ultraviolet absorbing component is present in an amount effective to absorb ultraviolet light in the range of about 300 to about 400 nm.

4. The composition of claim 1 wherein said silicone base polymer has the formula:

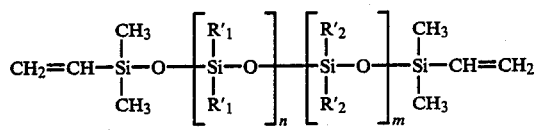

wherein $R'_1$ is a methyl radical, $R'_2$ is selected from the group consisting of alkyl radicals, flouro alkyl radicals, alkenyl radicals with a terminal double bond, aryl radicals, substituted aryl radicals, and mixtures thereof, and n and are integers in the range of 0 to about 500.

5. The composition of claim 1 wherein said silicone base polymer is selected from the group consisting of polydimethylsiloxanes, poly(dimethyl-diphenyl) siloxanes, polyfluoroorganosiloxanes and mixtures thereof.

6. The composition of claim 1 wherein said silicone base polymer is derived from a two part, platinum catalyzed polymerization process.

7. The composition of claim 1 wherein $R_2$ is selected from the group consisting of a vinyl functionality, an acrylate functionality and a methacrylate functionality.

8. The composition of claim 1 wherein the ultraviolet absorbing monomer is 2-(2-hydroxy-3-t-butyl-5-vinylphenyl)-5-chloro-2H-benzotriazole.

9. The composition of claim 1 wherein the ultraviolet light absorbing component is present in an amount of less than about 1% by weight.

10. The composition of claim 1 which is defined utilizing at least one hydride functional siloxane crosslinking agent.

11. The composition of claim 1 which is optically clear.

12. A corneal contact lens, an intraocular lens or a corneal intrastromal lens comprising the composition of claim 15.

13. The composition of claim 1 wherein $R_2$ is a vinyl group.

14. The composition of claim 4 wherein said vinyl functional, polymerizable ultraviolet absorbing monomer is 2-(2-hydroxy-3-t-butyl-5-vinylphenyl)-5-chloro-2H-benzotriazole.

15. A corneal contact lens, an intraocular lens or a corneal intrasotromal lens comprising the composition of claim 13.

16. A corneal contact lens, an intraocular lens or a corneal intrastromal lens comprising the composition of claim 14.

17. A corneal contact lens, an intraocular lens or a corneal intrastromal lens comprising the composition of claim 1.

UNITED STATES PATENT AND TRADEMARK OFFICE
CERTIFICATE OF CORRECTION

PATENT NO. : 4,868,251

DATED : September 19, 1989

INVENTOR(S) : Cary J. Reich and Richard Christ

It is certified that error appears in the above-identified patent and that said Letters Patent is hereby corrected as shown below:

```
Column 1, line 30 change "in" to -- In --.
Column 2, line 4 change "withou" to -- without --.
Column 2, line 19 change "mehacryloxy" to -- methacryloxy --.
Column 2, line 26 change "Beseck" to -- Besecke --.
Column 2, line 32 change "et a" to -- et al --.
Column 2, line 35 change "trialkoxysilznes" to
    -- trialkoxysilanes --.
Column 3, line 49 after "preferably" insert -- a methoxy radical
        and the alkyl radical is preferably --
Column 7, line 3 change "Examle" to -- Example --.
Column 7, line 26 change "hydrox" to -- hydroxy --.
Column 8, line 19 after "coefficient)," delete "to".
Column 8, line 36 change "ACs" to -- ACS --.
Column 8, line 42 change "-3-5-butyl" to -- -3-t-butyl --.
Column 8, line 61 change "ml" to -- mls --.
Column 9, line 42 change "pure" to -- purge --.
Column 9, line 46 change "UV" to -- IV --.
Column 9, line 51 change "filtrated" to -- filtered --.
Column 9, line 65 after "hours" delete ".".
Column 14, line 19 change "defined" to -- derived --.
Column 14, line 2 change "n and are" to -- n and m are --.
```

UNITED STATES PATENT AND TRADEMARK OFFICE
CERTIFICATE OF CORRECTION

PATENT NO. : 4,868,251

DATED : September 19, 1989

INVENTOR(S) : Cary J. Reich and Richard Christ

It is certified that error appears in the above-identified patent and that said Letters Patent is hereby corrected as shown below:

Column 14, line 26 change "claim 15" to -- claim 11 --.

Signed and Sealed this

Second Day of October, 1990

Attest:

HARRY F. MANBECK, JR.

*Attesting Officer*     *Commissioner of Patents and Trademarks*